Dec. 4, 1934.  E. T. KEENAN  1,982,741

FRUIT JUICE EXTRACTOR

Filed May 17, 1930

Inventor
Edward T. Keenan
By
his Attorney

Patented Dec. 4, 1934

1,982,741

UNITED STATES PATENT OFFICE 1,982,741

FRUIT JUICE EXTRACTOR

Edward T. Keenan, Frostproof, Fla.

Application May 17, 1930, Serial No. 453,396

11 Claims. (Cl. 146—3)

This invention relates to an improvement in a method of extracting citrus juices by means of compressed air or other gases, or by means of a vacuum.

The use of citrus fruit juice as a beverage is becoming more popular, and methods are and have been developed for the placing of this fruit juice in cans or bottles, which will amount to about one-half the volume of the fresh fruit produced.

To extract this fruit juice from the fresh fruit has been a most expensive and unsatisfactory operation in connection with the problem. Heretofore, this has been accomplished by cutting the fruit in half and either squeezing the sections or holding the halves against a revolving burr to remove the juice and pulp from the hulls or skins of the fruit.

It is the object of this invention to substantially simplify and improve this operation by removing the juice through the use of compressed air or other gases, or even by the use of a vacuum, acting on the sections of the fruit to force the juice sacks from the skins and into a suitable receptacle.

Figure 1:
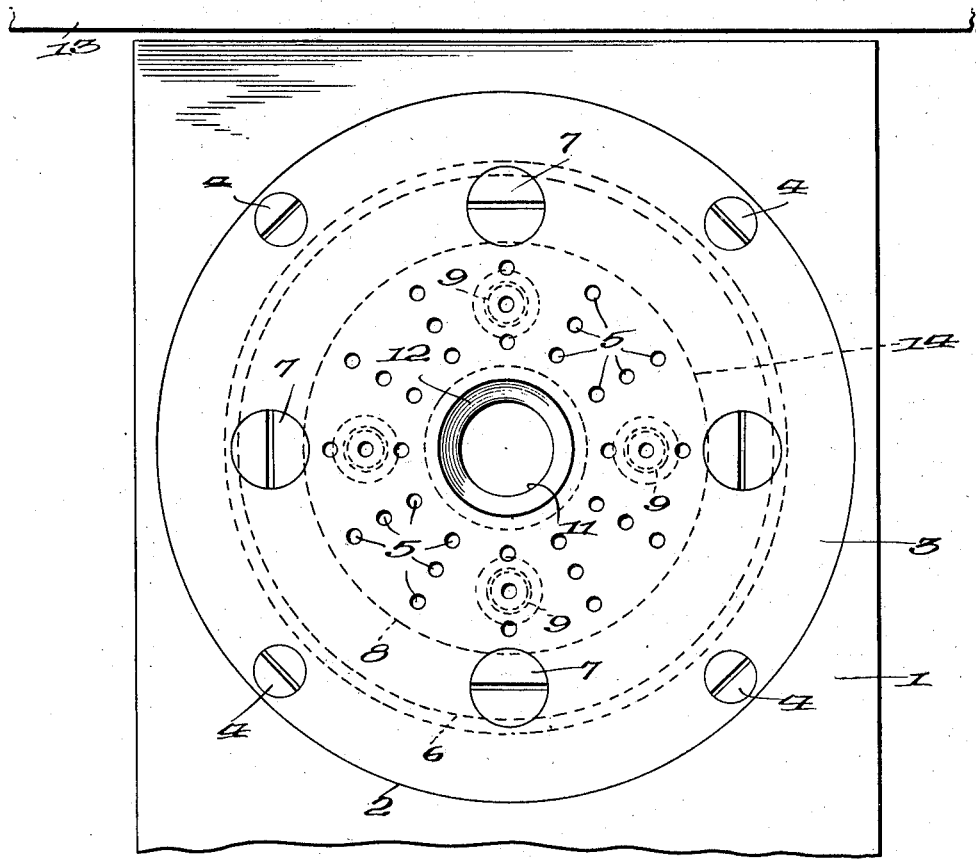
Figure 2:
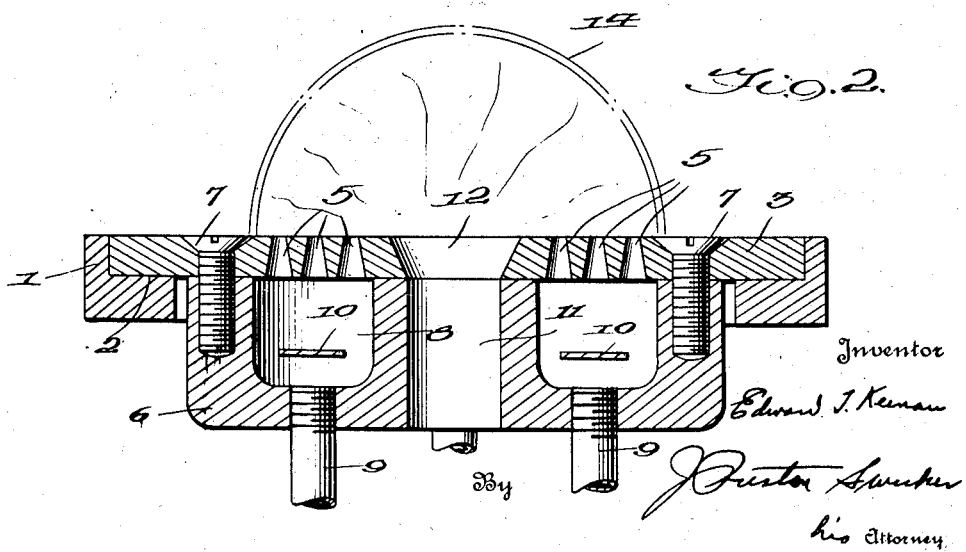

In the accompanying drawing:

Fig. 1 is a top plan view of an apparatus which may be used to carry out the invention; and Fig. 2 is a vertical sectional view therethrough.

A table is represented by the numeral 1, having a recess or seat 2 in the surface thereof, in which is mounted a plate 3 secured in place by set screws 4. The plate 1 is provided with a series of apertures 5 therethrough and so arranged as to be disposed under the half of a section of grapefruit, orange or the like, which may be placed over the plate 3.

A casing 6 is secured beneath the plate 3 by means of set screws 7, or the like, and this casing 6 has a chamber 8 therein communicating with the openings 5 in the plate 3. One or more pipes 9 extend to the chamber 8 for supplying air thereto, and if desired baffles 10 may be disposed in the chamber immediately above the openings of the pipes 9.

The casing 6 has a central opening 11 therethrough registering with a central opening 12 in the plate 3, through which the juice sacks and portions of the pulp may be removed therewith and forced downward into a suitable receptacle.

In the operation of the invention, the fruit, such as orange, grapefruit or the like, may be cut in half along a line corresponding with the equator, and the sections may be placed on a suitable belt conveyor, designated generally by the numeral 13, in Fig. 1, which travels along a table beside or in line with the plate 3. The sections of fruit are transferred from the belt to a position over the openings 5 in the plate 3, and these sections are designated generally by the numeral 14.

At the same time that the sections 14 are placed on the plate 3 over the openings 5, air will be automatically turned on through the pipe or pipes 9, the chamber 8 and the openings 5, forcing its way out through the openings in jets and into and about the juice sacks of the fruit, these jets of air cutting the juice sacks from the skin and blowing them down through the openings 11 and 12, where they are received in a suitable receptacle, such as a bucket or the like.

The sections 14 should preferably be rotated either manually or mechanically so as to bring different points in line over the openings 5 and to aid in cutting the juice sacks from the skins. After the juice sacks have been effectively removed from the skins, the latter are removed from the plate, which automatically cuts off the compressed air or other gases used until another section is in place.

The operation may be entirely automatic and serves as an effective means for removing the juice sacks from the sections of the citrus fruit.

While compressed air is preferable, yet other gases under pressure may be used instead, as found desirable, or a vacuum may be used in place of the compressed air or gases with this improved construction with slight alteration in the plate.

If desired, the air may be supplied through a revolving burr of the usual kind, the air jets forcing the juice sacks through openings in the plate.

I claim:

1. A method of extracting juice sacks or the like from citrus fruit, comprising subjecting the interior of the fruit to the action of air jets under a pressure greater than atmospheric to force the juice sacks from the skins.

2. A method of removing the juice or pulp from sections of citrus fruit or the like, comprising subjecting the interior of the fruit to the action of a jet of compressed gas to force the juice and pulp from the skins.

3. A method of removing portions from a half section of citrus fruit or the like comprising subjecting the open side of the section to one or more jets of compressed gaseous medium.

4. A method of removing juice and pulp from the interior of a half section of citrus fruit or the like comprising directing one or more jets of gas under pressure against the open side of the section.

5. A device of the character described comprising a plate having openings therein to receive a section of citrus fruit, and means for forcing jets of fluid from said openings to sever portions of the interior of the fruit from the skins thereof.

6. A device of the character described comprising a plate having openings therein to receive a section of citrus fruit or the like, and to apply a fluid action thereto to remove the juice sacks from the skins, said plate having an opening therein to be disposed approximately at the center of the fruit section to receive the juice sacks therefrom.

7. A device of the character described comprising a plate having openings therein to receive a section of citrus fruit or the like, and to apply a fluid action thereto to remove the juice sacks from the skins, said plate having an opening therein to be disposed approximately at the center of the fruit section to receive the juice sacks therefrom, and a casing secured beneath the plate and having a chamber therein communicating with the openings in the plate.

8. In a device of the character described, the combination with a table having a recess in the surface thereof, of a plate seated in said recess and having a plurality of constricted orifices in the surface thereof to be disposed beneath a citrus fruit section, said plate having an enlarged recess approximately at the center of the orifices for the removal of portions of the fruit section, a chamber disposed beneath and communicating with the orifices, and means for securing said chamber in place beneath the plate.

9. A fruit juice extractor comprising a nozzle having one or more openings therein to receive the open side of a half section of citrus fruit or the like, and means for forcing gas under pressure through said opening or openings in the form of jets which impinge against the open side of the fruit to remove portions of the interior from the skins thereof.

10. A fruit juice extractor comprising a nozzle having one or more openings therein to receive the open side of a half section of citrus fruit or the like, and means for forcing gas under pressure through said opening or openings in the form of jets which impinge against the open side of the fruit to remove portions of the interior from the skins thereof, said nozzle having an enlarged central exit opening to receive the removed portions.

11. A process for removing juice from succulent fruit comprising forming an opening in the covering of the fruit and impinging an air current against the succulent core to remove same through the opening of the covering.

EDWARD T. KEENAN.